United States Patent
Munafo

[11] 3,809,784
[45] May 7, 1974

[54] ELECTRICAL APPARATUS PROVIDING SELF-TEACHING ASSISTANCE

[76] Inventor: Vincent J. Munafo, 19121 Heber St., Glendora, Calif. 91740

[22] Filed: Oct. 24, 1972

[21] Appl. No.: 299,934

[52] U.S. Cl. ................................................. 35/9 B
[51] Int. Cl. ............................................ G09b 7/06
[58] Field of Search ..................... 35/9 B, 9 D, 31 C

[56] References Cited
UNITED STATES PATENTS
3,106,784  10/1963  Raley ................................. 35/9 C
2,970,386  2/1961  Knutson ............................ 35/9 B
3,137,079  6/1964  Greuzard ........................... 35/9 D Primary Examiner—Wm. H. Grieb
Attorney, Agent, or Firm—Christie, Parker & Hale

[57] ABSTRACT

There is described an electrical apparatus on which can be mounted any one of a plurality of instructional cards having questions and answers. The apparatus receiving the card has a pair of selector switches arranged to respectively select a question on the card and an answer. After the two switches are set to the selected positions, a push-button is operated lighting one of two lights, indicating whether the correct or a wrong answer has been selected.

1 Claim, 4 Drawing Figures

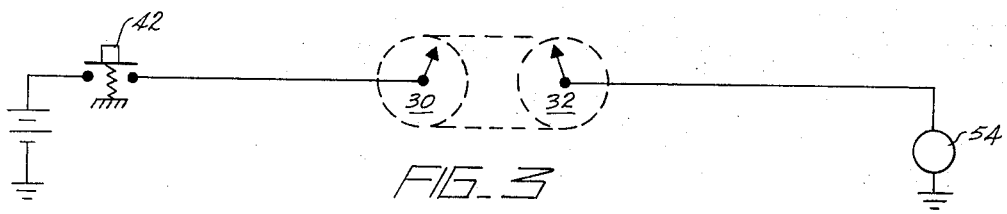
FIG.3
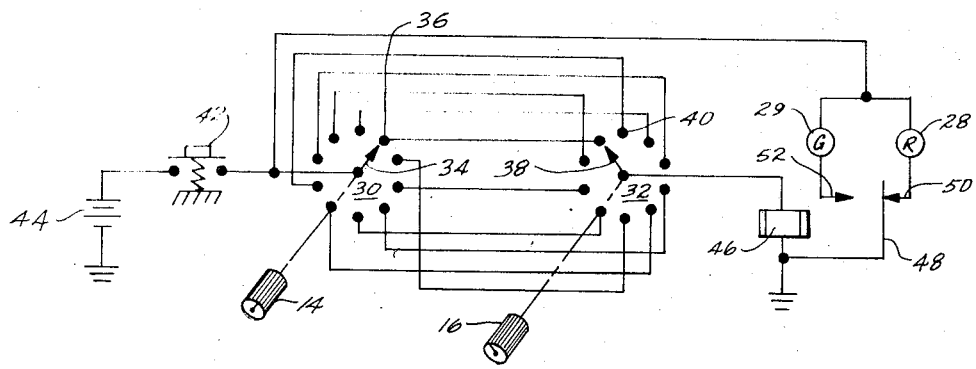
FIG.2
FIG.4
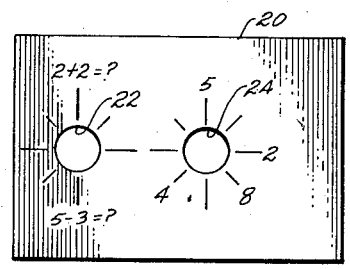
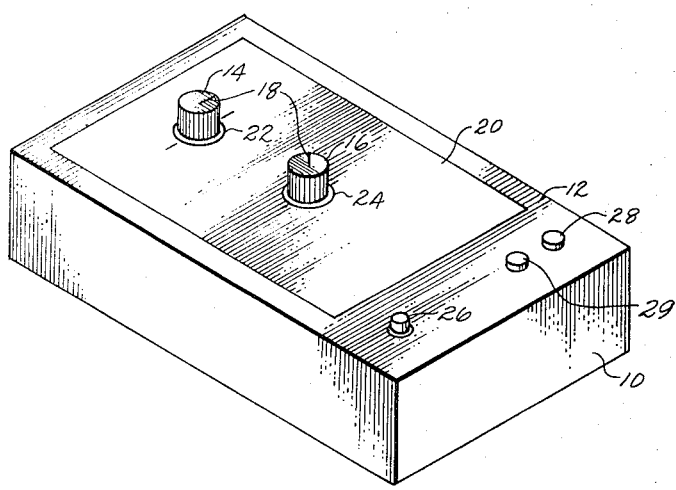
FIG.1

3,809,784

ELECTRICAL APPARATUS PROVIDING SELF-TEACHING ASSISTANCE

FIELD OF THE INVENTION

This invention relates to a self-teaching device, and more specifically, is concerned with an electrical apparatus for indicating correct answers to multiple-choice questions.

Self-teaching aids are well known in which a person can test his knowledge by choosing, among a plurality of answers, what he believes to be the correct answer to a question. Such multiple-choice tests are provided in a number of forms which usually require the answering of a number of questions and then looking up to see whether the correct choices have been made in the answers. Teaching machines have also been heretofore proposed to provide a more systematic arrangement by which a person can answer questions by multiple choice and immediately test the validity of his answer. Such known arrangements have either involved complex electrical and/or mechanical devices or have been very limited in the number of questions which could be handled by the device.

SUMMARY OF THE INVENTION

The present invention is directed to a teaching device of the type in which answers to a series of questions can be selected on a multiple-choice basis, the device being arranged to indicate immediately whether the person has made a correct or incorrect selection of the answer to each question. More specifically, the device of the present invention permits an unlimited number of questions to be tested. The questions can be taken from groups of standardized questions or may be questions along with a group of answers prepared by the parent or teacher to fit the needs of the pupil.

In brief, the advantages of the present invention are achieved by providing an apparatus on which can be mounted a card selected from a library of cards, each card having a plurality of questions and a plurality of answers printed or written on the card. The apparatus is provided with a pair of rotary switches, each having manual control knobs, the cards having openings arranged to fit over the knobs. The questions are arranged so that one knob can be used to select any one of a plurality of questions by changing its angular position. The other knob is arranged to select any one of a plurality of answers by changing its angular position. After selection of a question and answer by positioning of the two knobs, a person can test the correctness of the answer by pushing a button on the apparatus which causes either a green light or red light to be illuminated, depending upon whether the selected answer is correct or incorrect.

BRIEF DESCRIPTION OF THE DRAWINGS

For a more complete understanding of the invention reference should be made to the accompanying drawings wherein:

FIG. 1 is a perspective view of the apparatus with a question and answer card mounted thereon;

FIG. 2 is a wiring diagram of a preferred circuit for the apparatus of FIG. 1;

FIG. 3 is an alternative circuit arrangement; and

FIG. 4 shows a typical question and answer card.

DETAILED DESCRIPTION

Referring to FIG. 1 in detail, the numeral 10 indicates generally the frame of the apparatus which preferably is in the form of a box molded from plastic or other suitable material. The box has a flat top surface 12. Projecting above the surface 12 are a pair of control knobs 14 and 16, each of which is provided with a suitable pointer 18 for indicating the angular position of the knob.

A replaceable question and answer card 20 is provided with a pair of spaced-apart holes 22 and 24 by which the card slips over the knobs 14 and 16 and rests against the top surface 12. Thus the card 20 is easily removed and replaced by any one of a plurality of pre-printed cards containing printed questions and answers.

As shown in FIG. 4, the card is arranged with a plurality of items, usually in the form of questions which must be selectively matched against a second group of items or answers. The first group of items is arranged to be selected by turning the knob 14 until the pointer 18 points to the selected item or question. Similarly the second group of items or answers is arranged so that rotation of the knob 16 points to a selected one of the items or answers.

Mounted on the top surface 12 is push-button switch 26 and a pair of indicator lights 28 and 29. The two lights are preferably of different colors, such as red and green, for indicating respectively the selection of an incorrect or a correct answer.

As best seen in FIG. 2, the electrical circuit for controlling the lights 28 and 29 is shown in detail. The circuit includes a pair of rotary switches indicated at 30 and 32 respectively. The switch 30 includes a rotating contact 34 which is rotated by the knob 14. The switch 30 includes a plurality of fixed contacts 36, ten such contacts being shown by way of example. The rotary switch 32 similarly includes a rotary contact 38 which is controlled by the knob 16 and a plurality of fixed contacts 40. Each fixed contact 36 of the rotary switch 30 is electrically connected to one of the fixed contacts 40 of the rotary switch 32. The rotary contact 34 of the switch 30 is connected through a normally open push-button switch 42 to one terminal of a suitable current source such as a battery 44. The rotary contact of the switch 32 in turn is connected to the other terminal of the current source 44 through the coil of a relay 46. The relay 46 controls a switch 48 having a normally closed contact 50 and a normally open contact 52. The relay switch completes a circuit selectively through the red light 28, the normally closed contact 50 and the push-button switch 42 to the current source 44. The relay switch 48 completes a circuit through the normally open contact 52, the green light 29 and the push-button switch 42 to the current source 44.

In operation, the knob 14 is rotated to an angular position corresponding to a selected question on the card 20. The knob 16 is then used to rotate the switch 32 through an angular position corresponding to the selected answer. Only if the correct answer is selected, is a circuit completed between the rotary contacts and the particular stationary contacts of the two switches 30 and 32. On closing of the push-button switch 42, the relay 46 is energized from the source 44 causing the switch 48 to complete a circuit through the green light 29. On the other hand, if the angular positions of the two rotary switches 30 and 32 have not been positioned correctly, the closing of the push-button switch 42 does not energize the relay 46, permitting a circuit to be completed through the red light 28.

A simplified circuit arrangement is shown in FIG. 3 in which the relay 46 and associated switcing circuit is replaced by a single visual or audio indicator 54 connected in series circuit with the switches 30, 32, and 42. Thus the indicator 54 is actuated in response to closing of the push-button switch 42 only if the rotary switches 30 and 32 have been positioned in the correct relationship to complete a circuit. While the circuit is simpler, it has the disadvantage that no positive indication is given of an incorrect answer to a question.

From the above description it will be recognized that a simple but effective apparatus is provided for enabling a student to test himself by selecting a card on any particular subject and then selecting from a number of questions on the card, and finally selecting the answer to a particular question which he thinks is correct. Actuation of the push-ubtton conforms whether his selected answer was correct or not. It will be appreciated that the card should be placed between the two switch knobs, but this would limit the number of knob positions available for use.

A library of cards can be printed up on any number of subjects and the questions can be organized so as not only to teach but instruct in a systematic way the subject matter involved. Thus a scientific and highly effective teaching aid is provided. Cards can be prepared by the teacher or parent using a master card indicating the relation between the pointers of the two switches for each of the switch positions to cause the green light to operate.

What is claimed is:

1. An educational device comprising a housing having a card mounting surface, a pair of spaced-apart rotary switches mounted in the housing, each switch having a rotary contact and a plurality of fixed contacts, each switch including a knob for manually rotating the rotary contact of the switch, the knobs projecting above the card mounting surface and having pointers for indicating the angular position of the knobs, a replaceable card having a pair of openings adapted to receive and fit over the knobs, the card having two groups of indicia corresponding to the angular positions of the two knobs, means detachably securing the card in place on the card mounting surface of the housing so that one card can be replaced by another card with different sets of indicia, means electrically connecting each fixed contact of one switch to a fixed contact of the other switch, and circuit means connected between the rotary contacts of the two switches including an electrical current source, and electrical indicator means, the indicator means being energized by the current source when the two rotary contacts are positioned at two fixed contacts that are connected electrically by said electrically connecting means, whereby proper angular positioning of the two knobs relative to said two sets of indicia on the card activate the indicator means.

* * * * *